Oct. 25, 1960 D. E. GILLUM 2,957,653
AIRCRAFT G-LIMITER
Filed Feb. 11, 1957
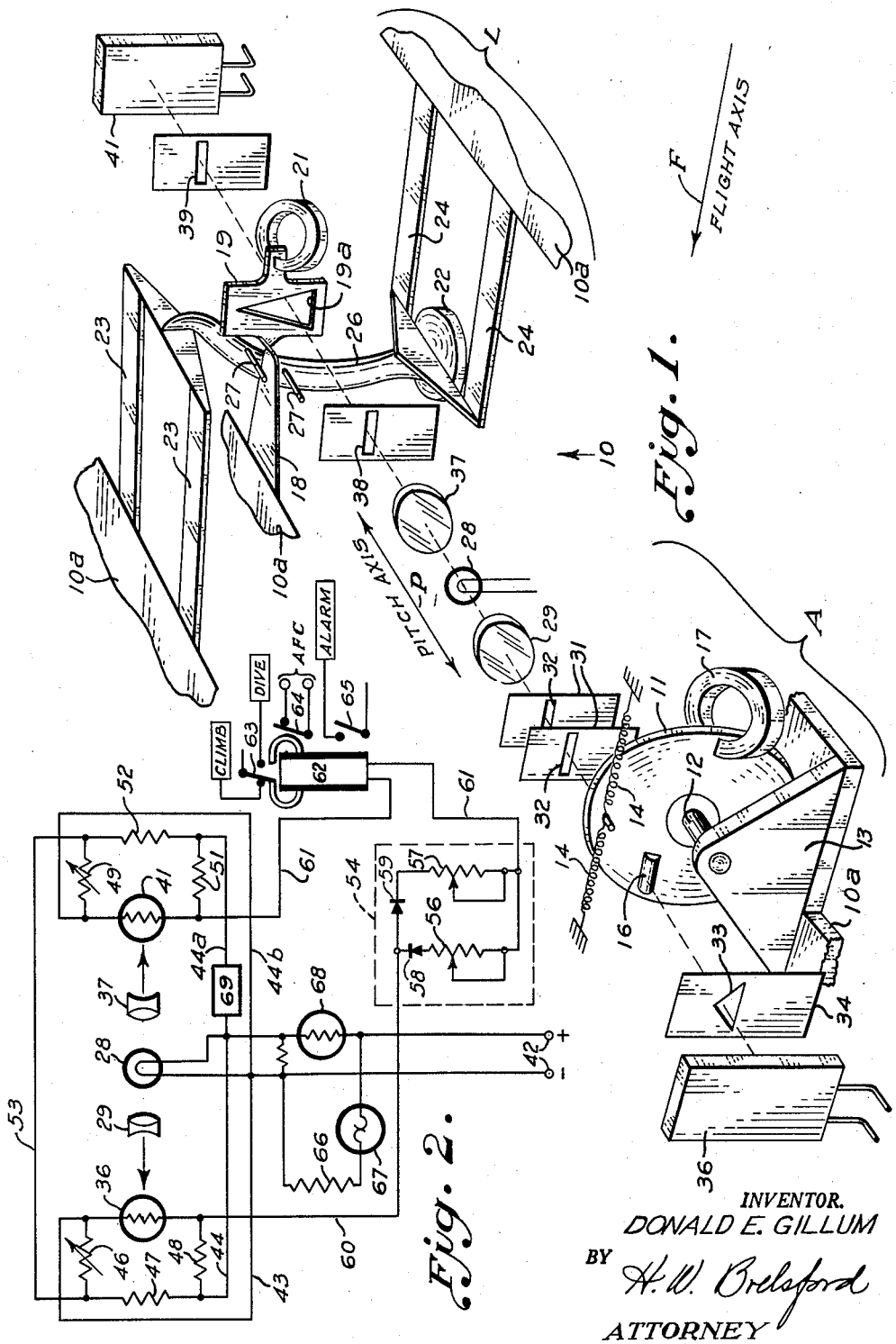
INVENTOR.
DONALD E. GILLUM
BY H. W. Brelsford
ATTORNEY

United States Patent Office 2,957,653
Patented Oct. 25, 1960

2,957,653
AIRCRAFT G-LIMITER

Donald E. Gillum, Long Beach, Calif., assignor to U.S. Industries, Inc., New York, N.Y., a corporation of Delaware Filed Feb. 11, 1957, Ser. No. 639,570

7 Claims. (Cl. 244—77)

This invention relates to automatic safety controls for aircraft and has particular reference to a device for controlling the flight path of an aircraft whenever the departures from straight line flight create structural loadings that are dangerous to the aircraft.

Airframes for airplanes, guided aircraft and guided missiles are designed to accommodate various structural stresses or loadings according to the type of service contemplated. Accordingly, commercial airliners are stress designed at relatively low loadings inasmuch as the flight path is controlled by passenger comfort. Combat airplanes, especially interceptors and fighter airplanes must be structurally much stronger because their flight paths are often violent and are limited primarily by the blackout limit of the human pilot, whose endurance in this regard has been raised by special suits and devices. Remotely guided aircraft and missiles are free of limitations attributable to humans in flight, but none the less have very definite structural loading limits that cannot be exceeded. In addition they have rigid structural stress limitations of the equipment carried such as vacuum tubes, the actuating force limits of relays, etc.

This structural loading of airframes or the structures of aircraft is usually designated in terms of forces related to the force of gravity, or G. Unity G is generally defined as the structural stresses imposed on the aircraft while in straight level flight. Diving the airframe reduces or reverses the apparent effect of gravity, while causing the airplane to climb results in positive acceleration, increasing stresses similar to those imposed by an apparent increase in gravity. Similarly, rotation of the aircraft about its flight axis creates loading which may similarly be calculated in terms of "G." However, rotation about a transverse axis aligned with the aircraft wings creates more serious loadings of the airframe. This rotation about such a transverse axis is referred to as pitch and the axis transverse to the line of straight flight and aligned with the wings is referred to as the pitch axis. When the airframe pitches during flight, either negatively or positively, G loading occurs as the airframe generally reacts by diving or climbing.

The device of this invention may be connected to a power flight control system in which case it automatically takes over control of the flight path of the aircraft when predetermined limits of loading are exceeded. The device then controls the flight path to retain the aircraft within the prescribed limits. For this reason the device may be termed a G-limiter, that is, a device that limits the G loading of the airframe. Alternatively, the device can release an automatic flight control to manual control, or can merely operate a warning signal.

The environment in which the G-limiter must operate imposes more problems than the specific problem for which it is intended. Airframes traveling fast enough to require a G-limiter invariably have violent aerodynamic stresses that manifest themselves in high amplitude vibrations of various parts of the airframe. This vibration gives rise to movements within the airframe that would correspond to G loadings in excess of the limits of the G-limiter. A simple accelerometer placed in an airframe accordingly would be continuously responding during normal safe flight because of these high amplitude vibrations. The G-limiter accordingly is supported on a vibrating airframe which creates G loading movements exceeding the response limits.

The characteristic airframe vibrations are most severe in the frequency range of 30 c.p.s. to 500 c.p.s. One solution to the problem of distinguishing between airframe vibration and G loading due to flight path is to mount an accelerometer on the airframe and deliver its response to a computing machine that integrates the response with respect to time. In this manner the short duration G responses caused every half cycle of a vibration could be made non-responsive for appreciable time periods that are acceptable as time lags. Such computers have been tried and proven unsatisfactory for the problem. Mechanical equivalents of such computing machines have also been attempted including flywheels mounted on precision bearings. All these various attempts have heretofore proven unsatisfactory.

Other environmental factors raise additional problems. Due to the high speeds of travel of present day aircraft and missiles, a deviation from a straight line of less than one degree of angle will result in stresses exceeding the G loading limits. The device accordingly must respond to very minute movements which are barely detectable to the human eye. The detection of the response of the G-limiter therefore becomes a major problem, particularly in view of the constant vibration to which the whole device is subject.

This invention is based on the discovery that the function of computing machines may be built into the mechanism by the use of relatively simple mechanical, electrical and optical structures. The present device employs linear and angular acceleration detectors or accelerometers that are operated simultaneously and their output is algebraically combined to give a single response. The angular accelerometer is mechanically constructed to be balanced and therefore is relatively independent of linear vibration. The linear accelerometer has a built-in vibration filtering or isolating structure which eliminates the major part of the vibration and an acceleration responsive element is so mounted and connected to this vibration isolator that the balance of the vibration response is eliminated. The amount of mechanical response is optically detected and actuates an electric or electronic circuit wherein the algebraic addition preferably takes place. Electrical or electronic time delays may be incorporated in this circuit to complement the mechanical delays to give the desired final time responses.

A general object of the invention is to provide an automatic device for controlling aircraft when predetermined G loadings of the aircraft structure are exceeded.

Another object is to provide a G-limiter for aircraft that responds primarily to forces induced by changes in pitch of an aircraft.

Still another object is to provide a G-limiter for aircraft that is substantially independent of vibration of the structure of the aircraft.

A further object is to provide a G-limiter structure wherein the acceleration movement of the structure is integrated against time by the structure of the G-limiter without resort to an independent computer.

Another object is to provide a G-limiter responsive simltaneously to angular and linear accelerations of an airframe as a whole.

Other objects and advantages of my invention will be apparent in the following description and claims considered together with the accompanying drawings in which, Fig. 1 is an isomeric schematic view of various optical and mechanical portions of a preferred embodiment of the invention, and Fig. 2 is a circuit schematic drawing of the electrical and electro-optical circuit for the G-limiter of Fig. 1.

Referring to Fig. 1, the mechanical, electrical and optical portions of the structure for detecting linear acceleration are designated by the letter L and the portions for detecting angular acceleration are designated by the letter A. The entire structure of the G-limiter is referred to by the numeral 10 and portions of the supporting frame or housing are designated by the numeral 10a.

Considering now the angular acceleration portion A, there is provided an inertia mass 11 supported on a shaft 12 by means of low friction bearings so that the shaft 12 may rotate freely with respect to the mass 11 which remains practically stationary. The shaft 12 may be secured to a suitable bracket 13. Opposed springs 14 yieldably hold the rotatable mass 11 in a rest position with reference to the device frame 10a. These springs 14 are extremely weak compared to the mass of the inertia member 11 but are sufficient to return the rotor to its rest position with an order of speed corresponding to about 10 cycles per second.

The rotor 11 has a window through which light may pass and the light passing therethrough may be deflected, if desired, by means of a semi-cylindrical glass or other transparent lens element 16. This optical deflection accentuates relative movement between the rotor 11 and the frame 10a. The relative movement between the inertia mass 11 and the entire device 10 is damped to eliminate unwanted oscillations of the mass 11. This may be accomplished by magnetic damping wherein a permanent magnet 17 is disposed over the wheel so that the metal of the mass 11 fits within the gap of the magnet 17. The material of the metal inertia mass 11 is preferably nonmagnetic for this type of damping. The damping is critical in nature, that is, the damping is such that after maximum deflection the rotor 11 returns to its rest position in the shortest possible time without overshooting the oscillation. In actual practice .6 or .7 critical damping has been found to be satisfactory and is presently preferred.

The rotor 11 for detecting angular movements is so constructed that it is free of torsional or non-angular vibrations. Inasmuch as non-angular vibrations are the major problem the rotor 11 is relatively insensitive to vibration, especially since it is a dynamically balanced rotatable element. The entire G-limiter of Fig. 1 is so disposed in the aircraft that the rotor 11 detects pitch movements of the aircraft and accordingly the axis of rotation of the rotor 11 is parallel to the pitch axis of the aircraft, designated by the letter P. This pitch axis is generally transverse to the line of flight of the aircraft and in level flight would be horizontally disposed. The flight axis of the aircraft is, of course, transverse to the pitch axis, as designated in Fig. 1 by the arrow F.

Considering now the linear accelerometer portion L of the G-limiter 10, a cantilever leaf spring 18 supported by the frame 10a has a window member 19 carried on its free end. This cantilever leaf spring has a relatively high natural frequency which may be on the order of several hundred c.p.s. The leaf spring is preferably mechanically damped as by coating the spring with a low shore rubber or other adhesive of the order of art gum or sponge rubber. Additionally, the free end of the leaf spring 18 is damped as by a permanent magnet 21 disposed about the metal of the window member so that the metal of the window cuts lines of flux in the gap of the magnet 21. The leaf of spring 18 is generally parallel to a plane defined by the flight axis F and the pitch axis P.

The principal inertia or acceleration mass of the linear accelerator L is the element 22 which is supported by two sets of leaf springs, an upper set 23 and a lower set 24. Both sets are cantilevers mounted on the frame 10a and their free ends are joined by a generally vertical (at rest) support member 26. These leaf springs are mounted with the leaf parallel to the plane defined by the pitch and flight axes P and F. These leaf springs are preferably coated with a low elasticity or low shore substance also to give mechanical damping and may be fluid or magnetically damped, although this is not shown.

The weight of mass 22 and the rate of springs 23 and 24 are selected particularly in accordance with the invention. It has been discovered that the severe vibrations which are in the 30 to 500 c.p.s. range, can be isolated by an accelerometer having a natural period of vibration below the troublesome frequency range. It has been discovered further that the time period of response of the entire G-limiter is preferably as slow as practical and in actual flight on a particular airplane the safety of the aircraft can be assured if the over-all control of the aircraft can be accomplished in about one-tenth of a second. Considering the natural frequencies of the spring biased inertia weights as the determining factor of response, then a 10 c.p.s. natural frequency will give a half cycle time period of one-twentieth of a second for the G-limiter response. This, together with the operation of aircraft controls and aircraft response time, will generally give the over-all response time of one-tenth second.

This correlation of G-limiter response time and the natural frequencies of the spring biased inertia weights is accomplished in the present invention by so selecting the mass of element 22 with respect to the rates of springs 23 and 24 that a half cycle of the natural frequency is roughly the same as the over-all time period response for the device. For the particular airplane wherein a one-tenth second response is needed, the natural frequency was selected at 10 cycles per second. For other aircraft of different construction, or operating under different conditions, different response times may be required, and the ratio of G-limiter response time to aircraft response time may be different. The control of the present invention operates in one-half cycle of the natural frequency and it is this elemental time period that is embodied in the present illustration.

It will be noted that small movements of the mass 22 do not cause movement of the window 19. This window can be moved by the mass 22 when the mass travel exceeds the play or lost motion established by the pins 27 projecting from connecting member 26 and disposed one above and one below leaf spring 18. The window leaf spring 18 is free to vibrate within the limits imposed by pins 27, but this vibration is damped by the magnet 21. The play permitted by pins 27 accommodates the low frequency vibrations of the mass 22 which cannot be completely eliminated as a practical matter. The linear acceleration system L therefore is relatively insensitive to the severe airframe vibrations, damps out the major vibrations in a vertical direction, and accommodates the residual vibrations. By mounting the window 19 on a horizontally disposed leaf spring, the vibrations parallel to the pitch axis are ineffective to cause window movement. The linear accelerator L is relatively insensitive to angular or torsional vibration and the oppositely disposed springs 23 and 24 render the system still more insensitive to such vibration.

It is presently preferred to detect and measure the mechanical response of the accelerometers optically although electrical indication through capacitive, inductive or resistive effects is feasible. For this purpose a light source 28, preferably an electric filament lamp, is provided whose light is collimated by an optical element 29 and is further collimated by an aligned pair of plates 31 having slits 32 formed therein. This highly collimated light impinges upon the cylindrical optical element 16 through which it is transmitted to pass through a triangular window 33 formed in a sheet 34. This light thereafter strikes a photo responsive electrical element 36 which is presently preferred to be a photo resistor, or photo conductor. More or less light falls on the photoconductor 36 depending upon the movement of rotor 11 relative to it. The optical element 16 functions as a light gate to vary the amount of light impinging upon the photo electric element.

Considering now the optical path for the linear accelerator L, the light from source 28 is collimated by a lens 37 and a plate slit 38 and thereafter passes through the triangular window 19a of the window member 19. The light passing therethrough is further collimated by a plate slit 39 to impinge upon a photoconductor 41. Movements of the window member 19 relative to the fixed collimators varies the light falling on photoconductor 41 and thereby creates a change in an electrical circuit. Window member 19 accordingly is an optical element that functions as a light gate.

A circuit for creating an electrical response to these photoelectric effects is illustrated in Fig. 2 wherein the photo conductors 36 and 41, the light source 28 and the collimating lenses 29 and 37 are indicated. A source of electrical current, preferably D.C., is indicated at 42 and conductors leading therefrom are connected to conductors 43 and 44 which deliver current to opposite corners of a bridge circuit of four resistors. One resistor in this bridge is the photoconductor 36, another is an adjoining variable resistor 46 and the other two are fixed resistors 47 and 48. The other photo conductor 41 is connected in a similar bridge circuit. Conductors 44a and 44b supply current to opposite corners of a four resistor bridge including a variable resistor 49 and two fixed resistors 51 and 52.

Photo induced variations in the resistors 36 and 41 change the instantaneous voltages at the other corners of the bridges and it is these changes of voltage that produce control currents. A conductor 53 connects corresponding corners of the two bridges so that their responses are opposed to each other. This connection gives rise to algebraic addition of the outputs or responses of the two bridge circuits. Bridge corners opposite those to which conductor 53 is connected are, in turn, connected by conductors 60 and 61 to a level control unit indicated by the broken line 54. This includes variable resistors 56 and 57 connected in parallel and the current direction flow through each resistor is controlled by rectifiers 58 and 59. Accordingly, positive current from conductor 60 flows only through variable resistor 56 and positive current from conductor 61 flows only through resistor 57. This, accordingly permits setting the current level in each direction by setting the resistive load for the current flow.

The current response through the level setter 54 may be used to operate a control element and this is illustrated as a relay 62 having an upper polarized armature 63 and two side armatures 64 and 65. The side armature 64 may be used to interrupt the current flow in an automatic flight control system, for example, an aircraft control system which locks the aircraft onto a moving target and follows the target until the aircraft is within range. Therefore, if the G loading results from such automatic flight control (AFC) then this control will be released and the pilot will be able to take over manual control of the aircraft. Additionally or alternatively, the armature 65 may operate an alarm for a pilot or a ground crew directing a missile. If, however, the correction of dangerous G loading is to be accomplished by automatic power means, then the contacts 63 may be employed to operate the elevator or equivalent control to give climbing or diving as required to correct the G loading.

The electrical circuit of Fig. 2 may have other components as desired and there is illustrated a heater resistor 66 controlled by a thermostat 67 for maintaining the entire device within a desirable temperature range for reliable mechanical, electrical or photoelectric operation, such as above 40° F. A voltage limiter or regulator unit 68 may also be used. If a smoothing network is required this may be inserted at 69.

Considering now the operation, the entire G-limiter 10 is mounted as indicated in Fig. 1 with respect to the pitch axis and flight axis of the aircraft. Electric power is supplied at terminals 42 lighting the lamp 28 and energizing the heater 66. Light will pass through the angular accelerator system A by passing through lens 29, slits 32, light gate optical element 16 and triangular window 33 to fall upon photoresistor 36. In the absence of relative movement of the wheel mass 11 a steady state resistance appears in photoconductor 36 preferably caused by a median amount of light passing through the triangular aperture.

The same steady state condition will appear in the linear accelerator L by a collimated slit beam of light passing through a median portion of the triangular window or light gate 19a. This, in turn, produces a steady resistance in photoresistor 41. These resistances appear at 36 and 41 in the circuit of Fig. 2 and the bridge resistors 46 and 49 are manually adjusted to balance one bridge against the other for this steady state condition. Thereafter no current flows between the bridges and relay 62 is not actuated.

If now the aircraft suffers an angular acceleration, the wheel mass 11 remains instantaneously stationary as the other elements of the unit experience an angular acceleration. Light passing through the cylindrical window or light gate 16 is deflected to a wider or narrower portion of the triangular window 33 depending whether the acceleration is negative or positive. This changes the resistance of photoresistor 36 causing a different voltage condition to exist in its bridge. This causes a current flow through conductors 60 and 61 to pass current to the relay 62. If the current exceeds the threshold of relay 62 for a sufficient time period, that relay will be operated, which in turn actuates flight control units that relieve the dangerous G loading, or actuates other devices. It will be noted that the threshold current of relay 62 and its time response period act as an integrating device for acceleration versus time. This is in addition to the time period responses of the rotatable mass 11 and the time of reaction of the photoconductors.

If the aircraft experiences a linear acceleration, the mass 22 will move relative to its supporting springs 23 and 24 and when this movement exceeds the lost motion determined by the spacing of pins 27, then the triangular window or light gate 19a will move. This upsets the steady state condition causing more or less light to impinge on photoconductor 41 depending on whether the acceleration is positive or negative. The corresponding bridge circuit is upset and current will flow through conductors 60 and 61 with the direction depending upon whether the acceleration is positive or negative. If the variation is large enough and for a sufficient length of time to exceed the current threshold of relay 62 and its time period, then a control response will result.

The responses of the two photoconductors 36 and 41 are added algebraically by the conductor 53. Accordingly, simultaneous negative angular acceleration and positive linear acceleration, either of which would individually actuate the relay, will cancel out each other. This may arise, for example, if an aircraft starts an outside loop and at the same time experiences a downward push, for example, due to an antiaircraft explosion. The acceleration cancellation corresponds to a stress cancellation in the aircraft airframe. Conversely, addition of angular and linear acceleration forces of like sign results in actuation of relay 62 even when the individual acceleration responses would not actuate the relay 62.

In operation, the airframe vibrations do not substantially affect the G-limiter. The dynamically balanced mass 11 of the angular accelerometer A is insensitive to all but torsional vibrations which generally are not severe. Such torsional vibrations are generally in excess of the natural frequency of mass 11 and mass movements are effectively damped by magnet 17. The airframe vibrations of the linear accelerometer L are generally in excess of its natural frequency and the induced vibrations of mass 22 do not actuate the accelerometer because the window member has a lost motion connection. The high frequency vibrations that affect window member 19 are effectively damped by magnet 21.

The invention has been described with respect to a preferred embodiment. It will be appreciated by those skilled in the art that various modifications and improvements can be made therein. For example, different photoelectric units could be used, different light gate structures could be used and the accelerometer responses could be added by means other than electrical. Accordingly the present invention is not limited to the disclosed embodiment and there is claimed all modifications and variations that fall within the true spirit and scope of the invention.

What is claimed is:

1. A G-limiter with a predetermined response time for controlling the flight path of aircraft having a flight axis and a pitch axis and power flight control means comprising: a linear accelerometer mounted to detect accelerations transverse to the pitch axis and the flight axis of the aircraft and having a natural vibration period on the order of twice said response time; an optical light gate element connected to the linear accelerometer with a lost motion connection; means for yieldingly holding the optical element in a normal position to permit limited oscillations of the linear accelerometer without movement of the optical element; means for damping the optical element; an angular accelerometer having an axis of rotation generally parallel to the aircraft pitch axis and having a natural vibration period on the order of twice said response time; an optical light gate element connected to the angular accelerometer; means for critically damping the angular accelerometer; a stationary light source disposed to transmit light to both optical elements; a stationary photoelectric element disposed adjacent each accelerometer to receive light transmitted from the source through the optical elements; a circuit connecting the two photoelectric elements in opposition to each other to obtain the algebraic sum of their response; mens in said circuit for detecting the sign of the algebraic electric response; and actuators connected to said circuit for operating the aircraft flight controls to correct the flight path to reduce G loading.

2. A G-limiter with a predetermined response time for correcting the flight path of an aircraft having a flight axis and a pitch axis and power flight control means comprising: a linear accelerometer mounted to respond to accelerations transverse to the pitch axis and the flight axis and having a natural period of vibration on the order of twice said response time; an angular accelerometer mounted to respond to angular accelerations about an axis parallel to the pitch axis and having a natural period of vibration on the order of twice said response time; means for algebraically adding the response of the two accelerometers; and an actuator for the aircraft controls responsive to the algebraic summing means.

3. A G-limiter as set forth in claim 2 in which damping means of selected quantitative damping for each accelerometer are provided so that both accelerometers are damped with approximately critical damping.

4. A G-limiter as set forth in claim 2 wherein the algebraic adding means is an electric circuit wherein the responses of like sign of the accelerometers are opposed.

5. A G-limiter as set forth in claim 2 wherein electro-optical means are employed to detect the response of the accelerometers and are connected to the algebraic adding means.

6. A G-limiter as set forth in claim 2 wherein the response of the linear accelerometer is by means of an indicator that is isolated within limits from movements of the linear accelerometer.

7. A G-limiter for aircraft having a flight axis and a pitch axis comprising: a linear accelerometer mounted to respond to accelerations transverse to the pitch axis and the flight axis; an angular accelerometer mounted to respond to angular acceleration about an axis parallel to the pitch axis; a light source; a photoelectric device for each accelerometer disposed to receive light from said source; means associated with each accelerometer and disposed between said light and the respective photoelectric device to vary the amount of light received by said photoelectric device for one position of the respective accelerometer compared to another position of said respective accelerometer; means for algebraically adding the response of the two photoelectric devices; and an actuator responsive to the output of the algebraic summing means.

References Cited in the file of this patent

UNITED STATES PATENTS

| | | |
|---|---|---|
| 2,529,985 | Williams | Nov. 14, 1950 |
| 2,672,334 | Chenery | Mar. 16, 1954 |
| 2,812,398 | Mickman | Nov. 5, 1957 |